US006687189B1

(12) United States Patent
Schaefer et al.

(10) Patent No.: US 6,687,189 B1
(45) Date of Patent: Feb. 3, 2004

(54) HIGH EFFICIENCY LONG LIFETIME SPARKER SOURCES

(75) Inventors: Raymond B. Schaefer, Lexington, MA (US); John Gallagher, Goffstown, NH (US)

(73) Assignee: Phoenix Science and Technology, Inc., Chelmsford, MA (US)

( * ) Notice: Subject to any disclaimer, the term of this patent is extended or adjusted under 35 U.S.C. 154(b) by 0 days.

(21) Appl. No.: 10/114,862

(22) Filed: Apr. 2, 2002

(51) Int. Cl.[7] ................................................ G01K 15/06

(52) U.S. Cl. ........................................................ 367/147

(58) Field of Search .................................. 367/147, 151

(56) References Cited

U.S. PATENT DOCUMENTS

| | | | | |
|---|---|---|---|---|
| 672,229 A | * | 4/1901 | Lacomme | 367/147 |
| 3,458,858 A | * | 7/1969 | Wright, Jr. | 367/147 |
| 4,734,894 A | | 3/1988 | Cannelli et al. | |
| 5,841,737 A | | 11/1998 | Schaefer | |
| 6,018,502 A | | 1/2000 | Fry, Jr. | |

OTHER PUBLICATIONS

ILC Technology, An Overview of Flashlamps and CW ARC Lamps, Technical Bulletin 3, date unknown, p. 31–35, Sunnyvale, CA.

Cole Robert H., Underwater Explosions, 1948, Dover Publications, New York, NY.

Caulfield, David D. et al., Improvements in the Continous Seismic Profiler, Manuscript from Woods Hole Oceanographic Institution, Woods Hole, MA, Contribution No. 1494 received by editor May, 1964.

Frungel, Frank B.A., High Speed Pulse Technology, Capacitor Discharges–Magnetohydrodynamics–X–Rays–Ultrasonics vol. I, Academic Press (1965), Academic Press, New York, NY.

S.I. Andreev et al., $CO_2$ Laser Intiated by a Gliding Discharge, P.N. Lebdev Physics Institute, USSR Academy of Sciences, No. 7, pp. 424–426, Apr. 5, 1975.

A.S. Bashkin et al., High–power 1 $\mu$sec Ultraviolet Radiation Source for Pumping of Gas Lasers, Journal of American Institute of Physics, vol. 6, No. 8, Aug. 1967.

D. Yu. Zaroslov et al., Spectral Characteristics of Vacuum Ultraviolet Preionization Sources for $CO_2$ Lasers, Journal of American Institute of Physics, Jun. 1978.

D. Yu. Zaroslov et al., Use of a Surface Discharge for Preionization of Gases in Discharge Lasers, Journal of American Institute of Physics, Aug. 1978.

Zobov et al., Investigation of Sliding Spark in Air, Translated from Zhurnal Prikladnoi Mekhaniki I Tekhnicheskoi Fiziki, No. 3, pp. 38–42, May–Jun., 1978. Original article submitted Dec. 23, 1976.

(List continued on next page.)

*Primary Examiner*—Daniel T. Pihulic
(74) *Attorney, Agent, or Firm*—Cesari and McKenna, LLP; Edwin H. Paul, Esq.

(57) ABSTRACT

An impulsive acoustic and radiation source is provided that maintains a constant electrode gap to provide efficient and long life operation. In one implementation the electrodes have a “toaster” arrangement. In another implementation the electrodes have a double annulus arrangement. The electrode gap may be maintained by interposing a non-electrically conducting material between the electrodes. In another implementation the electrode gap is maintain by the insertion of electrodes into a base. Also, the electrodes may be coated with a non-electrically conduction material. In alternative implementation, efficient and long life operation is achieved by feeding a material between widely spaced electrodes. In certain implementations an exothermic material is fed to increase the strength of the impulse from the sparker. Also, reflectors and enclosures are employed that increase the output utilization of the source.

31 Claims, 3 Drawing Sheets

OTHER PUBLICATIONS

Barger et al., The Air Gun Impulsive Underwater Transducer, J. Acoust. Soc. Am. 68(4), pp. 103–1045, Oct. 1980.

Baranov et al., . . . Preionization in Excimer Lasers, American Institute of Physics, Jan., 1981.

Paper by V.M. Borisov et al., Institute of Atomic Energy imeni I.V. Kurchatov, Moscow, vol. 10, No. 10 (136), pp. 2110–2112, Oct. 1983.

A.E. Beverly, III., Application of Surface Discharge for UV Photodissociation, Photoinitiation and Preionization of Gas–Flow Lasers, $5^{th}$ GCL Symp., Oxford, Aug. 20–24, 1984.

D. Yu Zaroslov et al., A Moving Discharge in $CO_2$ and Excimer Lasers, Translation of Akademiya Nauk SSSR. Radioteknika I elektronika., vol. 29, No. 7, 1984, pp. 1217–1241.

Rolf W.F. Gross et al. Investigation of the VUV Radiation Produced by a Sliding Discharge, Report of The Aerospace Corporation, Jun. 1986.

V.M. Borisov et al., The Kilowatt Range High Repetition Rate Excimer Lasers, The Troitski Kurchatov Research Institute, Troitsk, Moscow, 1991.

V.M. Borisov et al., Pulse–periodic 600–W XeCI Laser for Industrial Applications, Journal of American Institute of Physics, Feb. 1991.

D. Cathignol et al., Influence of Water Conductivity on the Efficiency and the Reproducibility of Electrohydraulic Shock Wave Generation, Inserm Unite 281, Lyon Cedex, France, Jun. 1991.

Seismic Profiling Instruments and Systems for Marine Engineering Surveys, EG&G Marine Instruments, Bulletin 2–100A, Oct. 1991.

* cited by examiner

HIGH EFFICIENCY LONG LIFETIME SPARKER SOURCES

The present application was developed at least in part under the following government contracts: Navy contract numbers N68335-98-0037, N68335-00-D-0471, and N00024-00-C-4111. The United States Government may have rights in this application.

STATEMENT REGARDING FEDERALLY SPONSORED RESEARCH OR DEVELOPMENT

BACKGROUND OF THE INVENTION

1. Field of the Invention

The present invention relates to impulsive sources, and specifically to high efficiency long lifetime sparker sources.

2. Background Information

Impulsive sources in liquids are important in a wide variety of military, industrial, academic, medical and environmental applications. Impulsive sources produce strong pulsed pressure oscillations and, in some cases, pulses of light, ions, electrons and chemical species. Impulsive sources in air and other media, although not generally in use, may have applications where the impulsive output is useful.

A variety of impulsive sources are known in the art. Explosives are strong and efficient impulsive sources but are limited to a single pulse per source. Due to safety concerns and environmental laws, explosives are not widely used outside the military. Air guns use compressed air to generate impulses, but are relatively inefficient, sensitive to water depth, and have not seen widespread use.

Sparker impulsive sources employ pulses of electrical energy deposited into a liquid (or other medium) to generate an impulse. Sparkers have one or more electrodes, which are important in determining the performance of sparker systems. Furthermore, sparker impulsive sources can be repetitively pulsed and have found commercial application in biofouling control, oil exploration and lithotripsy. Military applications include active sonar, environmental measurements, and mine and submarine countermeasures.

One representation known in the art (U.S. Pat. No. 6,018,502) employs a coaxial sparker in which the center electrode is a solid, similar to the end of a coaxial cable (i.e. a "single" annulus configuration). However, the "single" annulus limits the useful surface area of the inner electrode, limits lifetime and limits practical power.

Sparkers also generate a plasma and/or hot vapor that emits light. When operated in water, sparkers also produce OH radicals, electrons, ions and ultraviolet light that, when combined with the pressures generated, are useful for processes such as decontamination, disinfection, treating organically contaminated water and cleaning surfaces.

In addition, various electrode systems of sparkers known in the art have different limitations. One configuration employs a single metal electrode with the ocean acting as the second electrode, leading to large energy losses and inefficient operation. In another configuration, a primary electrode is surrounded by a cage, that acts as the current return, which also is inefficient in generating impulses. In another, a pair of opposing metal electrodes erodes over time. Since the efficiency of sparkers is sensitive to the electrode gap, performance is degraded by erosion.

In general it is desirable to have an electrode system that allows for rapid turn-on, is robust mechanically, minimizes electrical energy losses and has a high efficiency. Thus in order to be able to operate a sparker efficiently over a long period of time, it would be advantageous to maintain a constant gap between electrodes. Alternatively, it would be advantageous to operate a sparker in such a way that its efficiency is insensitive to electrode erosion.

Also, the impulse from each sparker is omnidirectional, so that in applications with an intended target region, acoustic energy is wasted. A means to recapture or redirect wasted energy is desirable. An acoustic reflector and/or enclosure can improve the utilization of sparker energy.

Accordingly, the present invention provides efficient operation of sparker impulsive sources with sparker heads that maintain a constant gap between electrodes or are insensitive to the electrode gap, and the present invention provides reflectors or enclosures for efficient utilization of impulsive output from the sparker.

SUMMARY OF THE INVENTION

The foregoing and other objects and advantages of the present invention are achieved by providing sparker heads with configurations that maintain a constant electrode gap or employ means for high efficiency operation that are insensitive to the electrode gap and/or employ acoustic reflectors and/or enclosures that direct the sparker output to meet requirements for specific applications.

In a sparker a pulsed electrical discharge produces a pressure pulse. In many sparkers known in the art, electrical energy is stored in a high voltage capacitor. A switch between the capacitor and sparker is then closed, applying high voltage to the electrode(s). In order to produce a strong impulse the electrical discharge must first initiate an electrical "breakdown". Sparkers that use a single electrode, and that utilize the ocean as the second electrode, are very inefficient because of losses to the "ocean electrode." Even in sparkers with two or more electrodes the initiation process can consume a large fraction of the energy stored in the capacitor and slow down the discharge, both of which decrease the efficiency of generating the impulse. In sparkers with two electrodes there is an optimum electrode spacing that depends on the capacitance, the charging voltage and the configuration of the sparker head.

In some instances the optimum electrode gap is small, ranging from less than $\frac{1}{64}$ to ½ inch. Furthermore, the optimum performance is sensitive to the gap. In some instances changing the electrode gap by as little as $\frac{1}{128}$ inch can significantly decrease efficiency. In applications where the sparker operates for many pulses, electrode erosion is a problem.

Consequently, sparker heads that maintained a constant electrode gap would be advantageous for maintaining performance. Alternatively, methods that increased the optimum gap separation, making performance insensitive to gap separation, also would be advantageous for maintaining performance.

One aspect of the invention is to employ a number of inventive arrangements that maintain a constant gap between electrodes. These arrangements have in common the use of parallel metallic electrodes that are electrically isolated except for exposed ends where the electric discharge takes place. In some embodiments a solid non-electrically conducting material is interposed between the electrodes whereas in others the electrodes have a non-electrically conducting coating and are supported and held in position by a base that maintains the electrode gap.

Alternatively, a second aspect of the invention is the injection of an external material between the electrodes. This increases the optimum gap up to several inches, with performance relatively independent of the electrode gap. Furthermore, in many instances electrode erosion is decreased. Consequently, efficient sparker performance is maintained for long operating periods without the need to replace the electrodes. The injected materials may be conductive, in the form of a wire, for instance, or may be a gas or gas mixture. In some instances, the material type and dimensions of wire may be chosen to produce an exothermic reaction and thus increase the acoustic performance. Furthermore, a mixture or slurry of exothermic material with gas or liquid may be used to increase the impulse.

A third aspect of the invention is to employ an acoustic reflector or enclosure to redirect acoustic and energy in a useful manner. The reflector may be a separate arrangement or be an integral part of an enclosure shroud or processing chamber. The reflector may be associated with individual sparkers, or with an entire array.

It will be appreciated by those skilled in the art that although the following Detailed Description will proceed with reference being made to illustrative embodiments, the drawings, and methods of use, the present invention is not intended to be limited to these embodiments and methods of use. Rather, the present invention is of broad scope and is intended to be defined as only set forth in the accompanying claims.

BRIEF DESCRIPTION OF THE DRAWINGS

The invention description below refers to the accompanying drawings, of which.

DETAILED DESCRIPTION OF AN ILLUSTRATIVE EMBODIMENT

Preferred embodiments of the present invention provide: high efficiency sparkers with long lifetimes with sparker heads that maintain a constant electrode separation; corresponding methods for operating sparkers with large electrode gaps; and use of reflectors and enclosures, which facilitates the efficient use of sparkers. Examples of impulsive sparker sources are useful a wide variety of industrial, military, academic, medical and environmental applications, for example, geophysical exploration (e.g., sub-bottom or underground profiling), pressure treating, lithotripsy, anti-biofouling, mine sweeping, underwater surveillance, sonobuoys, shallow water characterization, disinfection, and destruction of organic compounds, for instance, in industrial waste, groundwater, water supplies, and the like.

A variety of geometrical arrangements of constant gap electrodes, material injection and reflector and enclosure implementations are understood to be within the scope of the invention, but particularly advantageous arrangements and systems are illustrated in FIGS. 1–7.

Figure 1A:
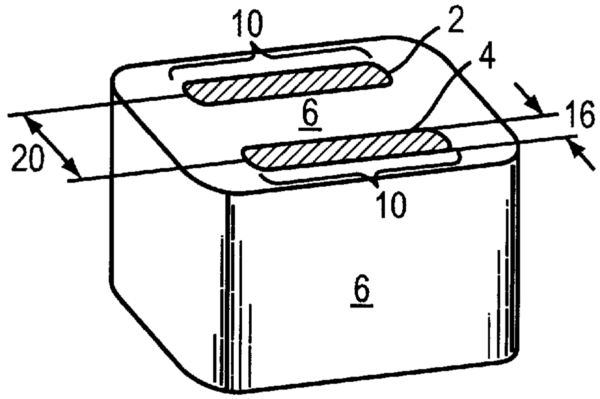
FIGS. 1A and 1B are isometric view of rectangular "toaster" sparker heads.
Figure 1B:
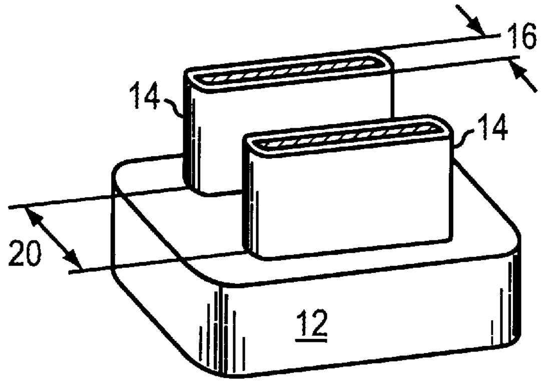

FIGS. 1A and 1B illustrate examples of a preferred arrangement for sparker heads that utilize a "toaster" arrangement of electrodes to maintain constant electrode gap is illustrated. In FIG. 1A the toaster sparker employs two metal electrodes 2 and 4 that are enclosed 6 by a non-electrically conducting dielectric material. The materials and their dimensions are chosen so that the erosion rates of the dielectric material and electrodes are equal. The electrode corners are radiused or rounded 10 to reduce the tendency for preferential discharge initiation at corners. In general, the electrodes may have different shapes and the proportions of the sparker in FIG. 1A may be quite different depending upon the application. The dielectric material, for example, may be a type of rubber, composite, plastic or thermoplastic or other similar material. In FIG. 1B the electrodes are coated with a non-electrically conducting material, with each electrode mounted in a base 12 that fixes the distance between the electrodes. The coating material 14 may be a rubber, plastic, urethane and the like that may be applied in liquid form, or may be a diamond like carbon or ceramic material applied using methods known in the art. In FIG. 1B the electrodes are held in place securely to prevent the pressure pulse that accompanies a discharge from causing either the electrodes to be pushed in relative to the dielectric or for the dielectric to be pushed in relative to the electrodes. Any number of mechanical means known in the art can accomplish this. These characteristics apply equally to all preferred embodiments of this invention where the electrodes are maintained with a constant gap. In order that the electrodes erode evenly, the thickness of each electrode 16 must be smaller than the electrode gap 20. Typically, the electrode thickness 16 must be less than about one quarter of the electrode gap 20, although the required relative size may differ with head design, materials and electrical driver in some preferred embodiments.

In other preferred embodiments (not shown) one or both electrodes may be split into one or more parts, wherein the split electrode functions electrically as a single electrode.

Figure 2A:
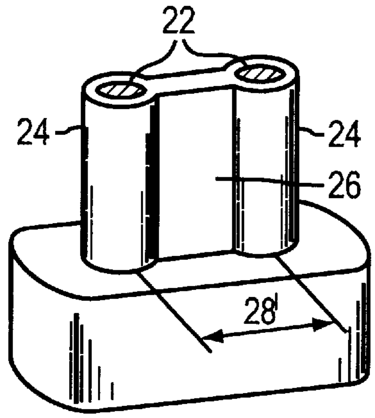
FIGS. 2A and 2B are isometric views of circular "toaster sparker heads.
Figure 2B:
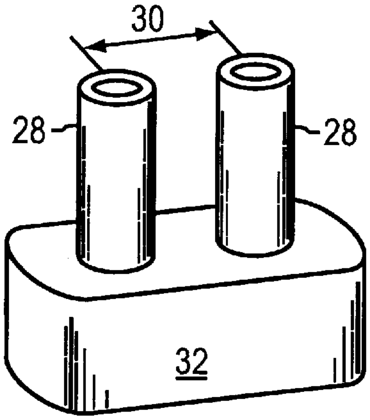

The alternate representation shown in FIG. 2 employs circular electrodes in an arrangement similar to the rectangular "toaster" electrodes in FIG. 1A and 1B. The circular electrodes in the embodiment in FIG. 2 are easier to fabricate than rectangular electrodes and thus cost less. In FIG. 2A the circular electrodes 22 are imbedded in a circularly shaped dielectric 24 with a bridge 26 that connects the electrodes and determines the electrode gap 28. In FIG. 2B, a thin dielectric layer 28 surrounds each electrode with the gap 30 determined by the placement of each electrode in a base 32. The dielectric material may be any of the materials mentioned herein or as known in the art.

Figure 3A:
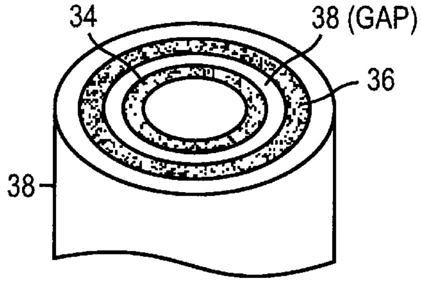
FIGS. 3A and 3B are isometric illustrations of double annulus sparker heads.
Figure 3B:
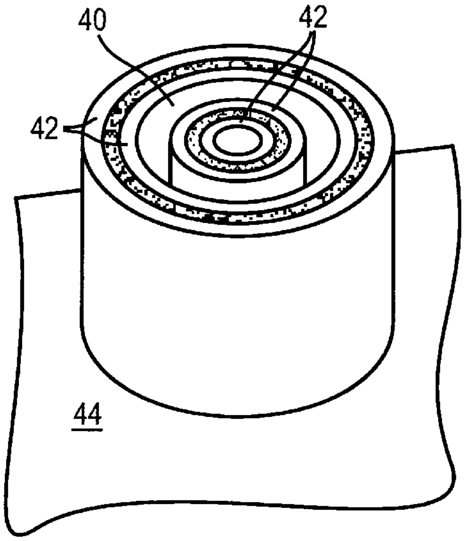

Another preferred embodiment exhibited in FIG. 3A employs a double annular configuration where the inner electrode 34 and the outer 36 are shaped as circular pipes each encased in, or coated with, a non-electrically conducting dielectric material 38. The "double annulus" embodiment in FIGS. 3A and 3B allows the surface area of each electrode to be made large while keeping the thickness of each electrode small. Sparks are initiated at random locations along the circumference of the electrodes, so that local heating from multiple impulses is reduced. The radial distance between the two annular electrodes determines the gap. In FIG. 3A the dielectric materials are solid, with no open spaces between the electrode materials. The embodiment in FIG. 3B employs an open gap 40 between each annulus, with each pipe coated on the inside and outside 42 with a non electrically conducting material. The position of the two concentric electrodes is determined by the placement of each electrode in a non-electrically conducting base 44. Although the electrodes are each shown with a dielectric coating, the invention also includes embodiments where no coating is applied to the electrodes.

Figure 4:
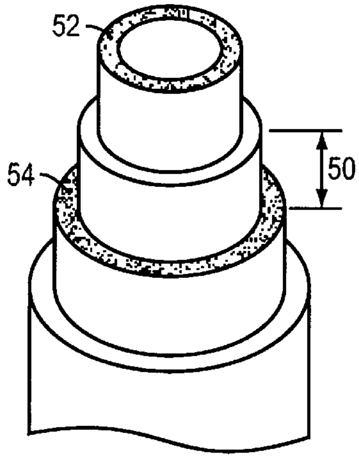
FIG. 4 is an isometric view of an elongated annular sparker.

FIG. 4 shows another annular configuration in which the annulus is elongated. In this configuration, the gap 50 is determined by the distance along the surface of the dielectric material between the inner 52 and outer 54 electrodes. The inner electrode may be an annulus, as shown, or a solid pipe.

An alternative means for initiating the sparker that both achieves high efficiency and long lifetime is to inject a material or materials into the region between the electrode gap. The injected material is the primary means for initiation, so that the acoustic efficiency is insensitive to the electrode gap. Although many different materials can be used and are understood to be included in the invention, preferred embodiments in FIGS. 5A and 5B and 6A and 6B employ injection of wire, gas or a mixture of materials for initiation.

Figure 5A:
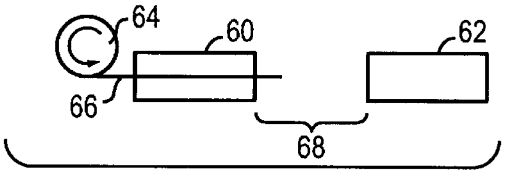
FIGS. 5A and 5B are schematic illustrations of a long gap wire initiated sparker.
Figure 5B:
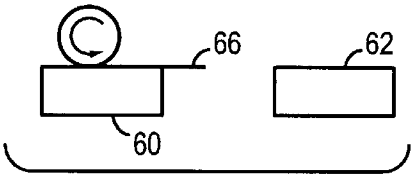

Referring now to FIG. 5A, opposing electrodes 60 and 62 have a mechanism 64 that feeds wire 66 to span the electrode gap 68 prior to each electrical discharge. The wire may be fed through a channel 70 centered in the electrode 60 or fed along an outside surface of the electrode 60 as shown in FIG. 5B. The wire material, diameter and length are chosen so that its resistance is large compared to the rest of the circuit, but low compared to the resistance without the wire. The electrical discharge evaporates the wire, creating a plasma for electrical energy to drive the sparker's impulse.

Many wire feed mechanisms are known-in-the-art, for instance in welders. The electrode wire material, diameter and the electrode gap that optimize operation change with the capacitance and charging voltage. Many wire materials known in the art may be used for the wire 66, including but not limited to copper, silver, brass, gold, etc. For example, the optimum length may vary from one to ten centimeters, for wire diameters ranging from about eighty down to two thousandths of an inch. The electrical discharge circuit stores the electric energy as a charge voltage on a capacitor. For capacitances of between one tenth and two hundred microfarads, and, for charging voltages ranging from one to twenty kilovolts, the above wire parameters may be used to advantage.

The use of wire initiation is particularly efficacious in sea water, where the use of a 20 thousands of an inch diameter copper wire can increase efficiency by a factor of two as well as increase the optimum electrode gap from about 0.25 to 4 centimeters and reduce erosion.

The invention also includes using wire materials that have exothermic reactions when evaporated by the electric discharge in the surrounding medium Applications of the invention include gas environments as well as liquid. Exothermic wire materials include, but are not limited to, materials such as aluminum, zirconium, titanium and the like. The use of these materials may significantly increase the impulse from the sparker, and their use is particularly advantageous in applications with limited volumes available for the sparker system. The use of aluminum wire can lead, for instance, to a doubling of the efficiency achieved with copper. To increase the exothermic contribution to the impulse the wire diameter may be made relatively large, up to 200 thousandths of an inch in diameter.

Figure 6A:
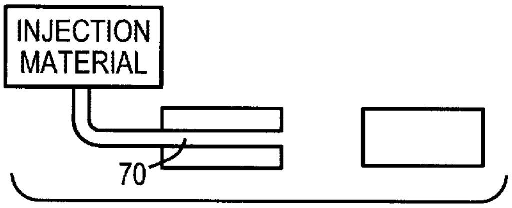
FIGS. 6A and 6B are illustrations of a gas initiated long gap sparker.
Figure 6B:
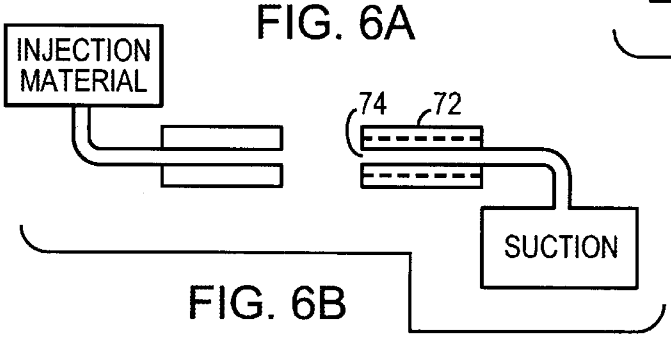

FIGS. 6A and 6B illustrate alternative embodiments for injecting material where a gas, liquid, exothermic material or some combination is injected between the electrodes. Any means known in the art may be used to mix and inject the materials into the gap between electrodes. Any type or types of gases may be employed, including, but not limited to, air, nitrogen, argon and other rare gases. Also, any liquid or liquids may be employed, alone or in combination with a gas. Also, an exothermic material may be injected alone or in combination with a gas or liquid. Also, although a single channel through the center 70 of a rectangular or cylindrical electrode is shown, multiple channels though any electrode shape known in the art may be employed. Also, the material feed is shown to be vertically upward to take advantage of buoyant forces that exist in specific applications but any direction may be employed.

FIG. 6B exhibits another embodiment in which the second electrode 72 has one of more channels 74 and means for creating a suction 76 on the channel(s) 74 to guide the injection flow between the electrodes. Any means known in the art may be used to create suction on the material flow. Also, although the suction is shown to be vertical to take advantage of buoyant forces, any direction may be employed Where single channel through the center of a rectangular or cylindrical electrode is shown in the FIGS. herein, multiple channels through any electrode shape known in the art may be employed.

The invention specifically includes the injection of powders and the like of materials that have exothermic reactions when interacting with the surrounding medium and/or from the electric discharge. This includes, but is not limited to, materials such as aluminum, zirconium, titanium and the like. The use of these materials may significantly increase the impulse from the sparker, and is particularly advantageous in applications with limited volume available for the sparker system. For this use, the feed channels may be relatively large to increase the exothermic contribution to the impulse. The powders and or materials may be combined with gas injection, or be injected alone or in combination with a liquid or liquids.

Another means for achieving high efficiency is to utilize reflectors or enclosures to redirect acoustic energy in a useful manner. The impulsive output from a sparker is omnidirectional, so that much of the output is not utilized in applications that utilize a directional output. A variety of means may be employed to redirect the output, including reflectors and enclosures of many sizes and shapes, but particularly advantageous embodiments are show in FIGS. 7A and 7B.

Figure 7A:
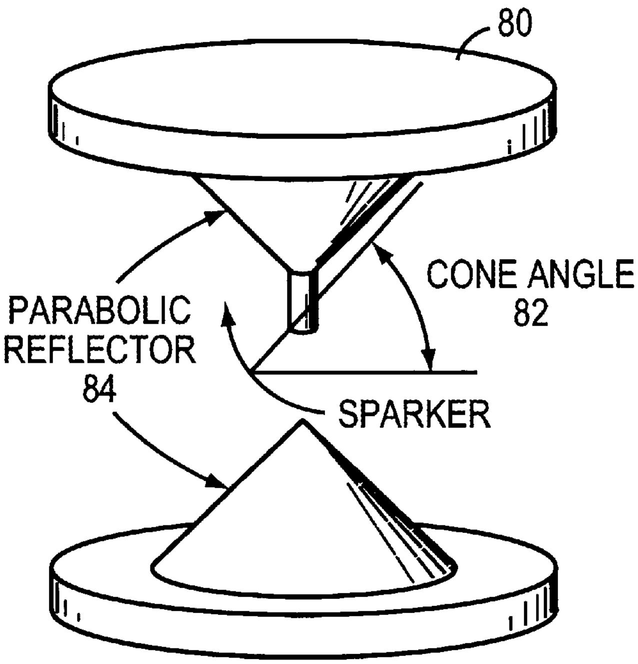
FIGS. 7A and 7B are illustrations of sparker reflectors and enclosures.

An embodiment which produces a semi-omnidirectional impulsive output, i.e. with a beam spread in a specific geometrical plane and cone angle, is shown in FIG. 7A. A sparker source is located at the focus of a parabolic reflector which is open in the back. This reflector is symmetric about the vertical axis 80, and produces impulsive output that is horizontal in all directions from the focus, with a beam spread about the horizontal axis determined in part by the cone angle 82 of the reflector. Impulsive output with a direction initially at an angle larger than the cone angle is reflected into the cone angle, thereby increasing the strength of the impulse in the desired direction. The reflector also may have elliptical shape, with the sparker at one focus, for producing high intensity at the second focus. The reflector 84 also may be a paraboloid or ellipsoidal, or have another shape, depending on the application.

Figure 7B:
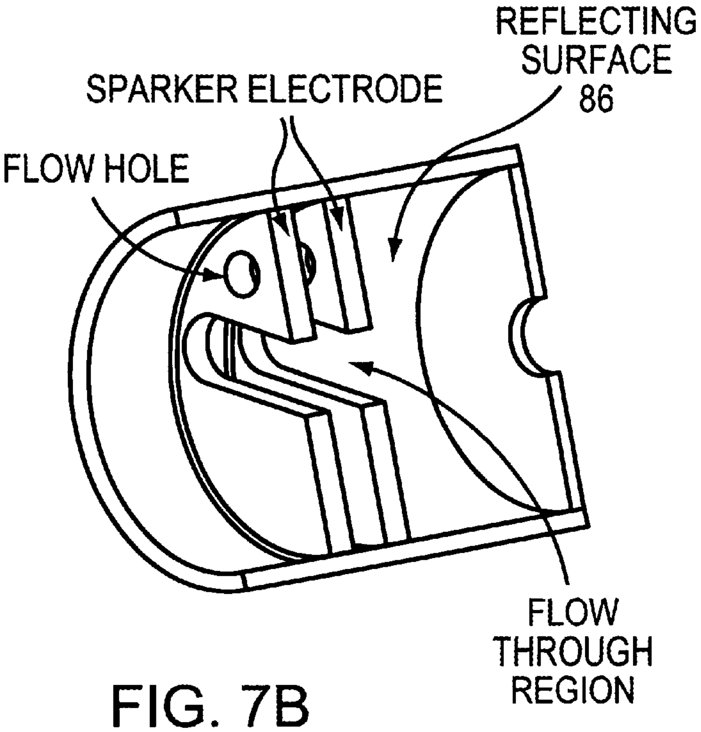

FIG. 7B shows a section of another embodiment in which the sparker is contained in an enclosure and a reflecting surface 86 concentrates the impulsive output into a given direction. This implementation is particularly advantageous in applications that utilize the impulsive output in a pipe or another enclosure. The output is contained within the enclosure and directed by the reflecting surface into a pipe (as shown in FIG. 7B) or to an adjacent chamber. This concept can be used to generate bidirectional output in a pipe, where the sparker/enclosure/reflector is connected to a pipe on both ends, and impulsive output is generated both to the right and left in FIG. 7B. The gap between the electrodes provides a flow through area, so that pipes with water flow can be "treated" by the impulsive output from the sparker. The flow through area can be increased by providing bypass holes to the side of the enclosure or in the electrodes.

The reflectors and enclosures indicated in FIGS. 7A and 7B may be made of a material with high acoustic reflectivity, such as steel or iron, or may be made of a material with low acoustic reflectivity, such as an acrylic or other plastic material with low acoustic impedance known-in-the-art, or hollowed out and filled with a gas to produce high reflectivity.

It should be understood that above-described embodiments are being presented herein as examples and that many variations and alternatives thereof are possible. Accordingly, the present invention should be viewed broadly as being defined only as set forth in the hereinafter appended claims.

What is claimed is:

1. A sparker source for generating an acoustic or light energy impulse comprising:

at least two electrodes separated by a gap, the gap defined as the path carrying the electrical energy pulse, means for maintaining the gap at a constant separation, an electrical source for generating electrical discharges in the gap, and wherein the electrodes are about rectangular in cross section and the spacing between the electrodes is filled by a non-conducting material that mechanically maintains the gap, wherein the non-conducting material erodes at substantially the same rate as the electrodes to maintain a constant gap.

2. The sparker source of claim 1 wherein the electrodes are concentric annuli, an inner annulus and an outer annulus, with the inner annulus extending beyond the outer electrode, the spacing between the electrodes is maintained by a non-conducting material and extending along the outer surface of the inner annular electrode, wherein the non-conducting material erodes at a rate that maintains the constant gap.

3. The sparker source of claim 1 wherein the corners of the rectangular electrodes are radiused.

4. The sparker source of claim 1 wherein the gap between the electrodes is maintained by fixing them in a base.

5. The sparker source of claim 1 wherein the rectangular electrodes have an electrically non-conductive coating.

6. The sparker source of claim 5 wherein the corners of the rectangular electrodes are radiused.

7. The sparker source of claim 1 wherein the electrodes are concentric annuli and the spacing between the electrodes is maintained by fixing them in a base.

8. The sparker source of claim 1 wherein the electrodes are circular and the spacing between the electrodes is maintained by an electrically non-conducting material, wherein the non-conducting material erodes at substantially the same rate as the electrodes to maintain a constant gap, and wherein a dielectric material encompasses the electrodes.

9. The sparker source of claim 7 wherein the sides of the annular electrodes are covered with non-electrically conducting material.

10. sparker source of claim 8 wherein the gap is maintained by fixing the electrodes in a base.

11. The sparker source of claim 10 wherein the circular electrodes have an electrically non-conductive coating.

12. The sparker source of claim 1 wherein the electrodes are concentric annuli, an inside annulus and an outside annulus, and the spacing between the electrodes is maintained by a non-conducting material, wherein the non-conducting material erodes at a rate that maintains the constant gap.

13. The sparker source of claim 12 wherein the center of the inside annulus is filled with an electrically non-conducting material.

14. The sparker source of claim 12 wherein the outside surface of the outer annulus is covered with a non-electrically conducting material.

15. The sparker source of claim 14 wherein the center of the inside annulus is filled with an electrically non-conducting material.

16. A sparker source for use with a liquid, vapor or gas medium, the sparker source comprising:

at least two electrodes separated by a gap of more than one centimeter, means for injecting materials into the gap, said materials being exothermic, thereby increasing the impulse, an electrical driver constructed to generate electrical discharges in the gap, each discharge adapted to generate an impulse of acoustic or light energy in conjunction with the injection of materials between the electrodes.

17. A sparker source of claim 16 further comprising a reflective enclosure arranged and constructed to receive and reflect the energy impulse.

18. The sparker source of claim 17 wherein the reflective enclosure is a parabolic reflector with an impulsive output semi-omnidirectional in a given plane with a beam spread determined by the reflector cone angle.

19. The sparker source of claim 18 wherein the reflective surface is constructed with a shape to optimize the impulsive output in a specified direction or delivered to a specific volume.

20. The sparker source of claim 16 wherein a conducting wire is fed into the gap along the outside surface of an electrode.

21. The sparker source of claim 16 wherein a conducting wire is fed into the gap through one or more channels in one electrode.

22. The sparker source of claim 16 wherein a gas, vapor or liquid is fed into the gap through one or more channels in one electrode.

23. The sparker source of claim 16 wherein a gas or vapor is fed along the outside surface of the electrodes.

24. The sparker source of claim 22 wherein suction from one electrode guides the gas or vapor feed.

25. The sparker source of claim 22 wherein suction from one electrode guides the gas or vapor feed.

26. The sparker sources of claims 22, 22, 24, and 25, wherein powder or granular forms of exothermic materials are added to the gas, vapor or liquid flow to increase the impulse exothermically.

27. The sparker source of claim 17 wherein the sparker source is located in an enclosure to contain the impulsive output.

28. The sparker source of claim 17 wherein the enclosure provides impulsive output to pipes at one or more connections to the enclosure.

29. The sparker source of claim 28 wherein the enclosure employs a reflective surface to enhance the impulsive output utilized in the adjacent pipe or other chamber.

30. The sparker sources in claims 27–29 wherein a liquid or slurry flows through the enclosure.

31. The sparker source claim 30 wherein the flow area is adjusted by adding bypass holes.

* * * * *